(No Model.)
A. JANIN.
ART OF AMALGAMATING SILVER ORES.
No. 516,055. Patented Mar. 6, 1894.
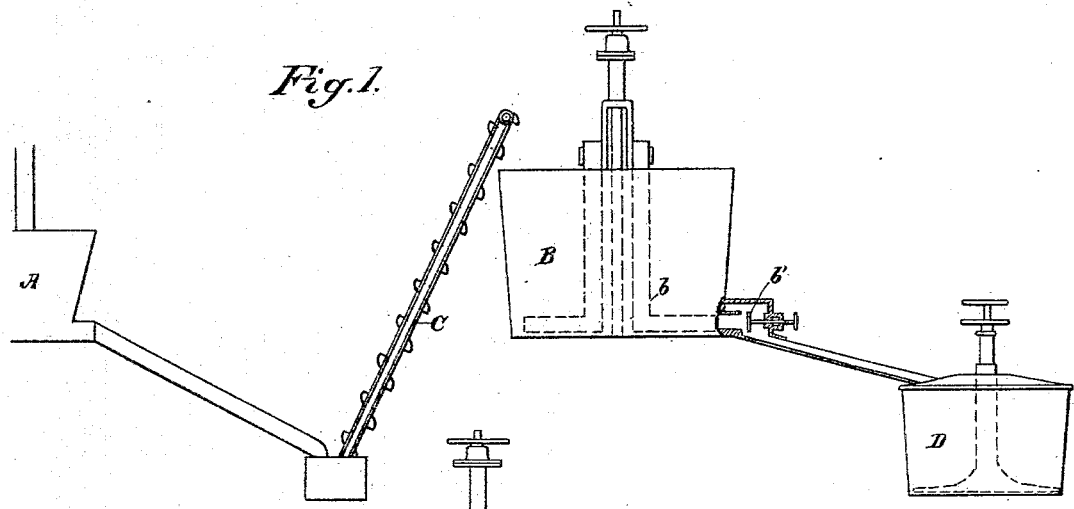
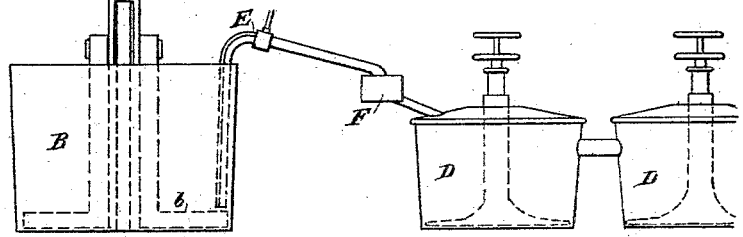
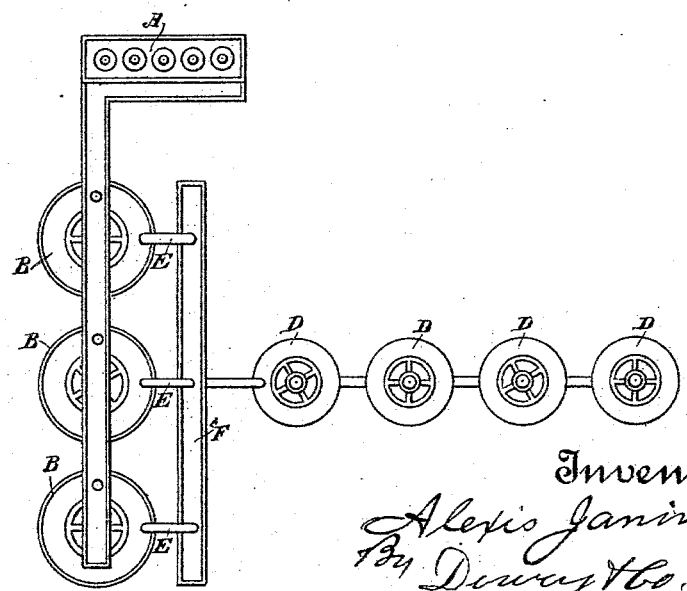

UNITED STATES PATENT OFFICE.

ALEXIS JANIN, OF SAN FRANCISCO, CALIFORNIA.

ART OF AMALGAMATING SILVER ORES.

SPECIFICATION forming part of Letters Patent No. 516,055, dated March 6, 1894.

Application filed February 28, 1893. Serial No. 464,261. (No model.)

*To all whom it may concern:*

Be it known that I, ALEXIS JANIN, a citizen of the United States, residing in the city and county of San Francisco, State of California, have invented an Improvement in the Art of Amalgamating Silver Ores; and I hereby declare the following to be a full, clear, and exact description of the same.

My invention relates to methods of amalgamating silver ore and to apparatus used in that connection.

It consists in its chemical part in adding to the ore, copper amalgam or its hereinafter described equivalent, and also adding certain acids or chemical salts, more particularly described farther on, which have the property of stimulating the desulphurizing and amalgamation of silver minerals, when the ore is amalgamated in pans together with mercury and the above mentioned substances.

The distinctive novelty of my process consists in the joint use of copper amalgam or its described equivalent and the special chemical salts or acids specified, or of others having an identical behavior when used in conjunction with copper amalgam, in the manner and for the purpose specified, which method of treatment I have found in practice to be the most speedy and efficacious for amalgamating silver ore. Moreover the direct use, in a pan, of copper amalgam or of substances forming rapidly copper amalgam, in conjunction with the aforesaid chemical salts or acids, hastens the operations; and furthermore the use of copper amalgam, cement copper or solid compounds of copper avoids the injurious action of soluble copper salts on the mercury or the iron of the pan.

In its mechanical features my invention consists of an apparatus for accumulating the crushed ore as it flows continuously from the battery, together with the water used in crushing, and then discharging the ore and water, at the required intervals, into amalgamating pans. In this manner, all loss or separation of the slimes and handling of the ore are avoided, and the tubs used as accumulators being provided with a stirring apparatus, the settling of the ore is prevented and a number of pans can be charged, from one accumulator, with pulp of uniform consistency. In all previous systems of conveying ore from the crushing apparatus to amalgamating pans, the ore is either first deposited in tanks, where it settles in layers of different degrees of fineness, and whence it is shoveled out into the pans, or it is carried continuously into a series of amalgamating pans, or is run into receptacles from which the slimes and excess of water overflow into other boxes and are handled separately.

In the accompanying drawings I show the apparatus in which I carry out my method.

In the drawings, Figure 1 is a view of an apparatus showing an accumulator in connection with pan and battery, when each pan receives and works, until amalgamation is completed, a separate charge of ore. Fig. 2 is a plan of three accumulators in connection with a battery and a series of pans as connected in a continuous system. Fig. 3 is an elevation of the same.

In United States Patent No. 481,031, dated August 16, 1892, I described a method of subjecting silver ore to the action of precipitated metallic copper and an acid salt, heating and stirring the pulp until the silver minerals are desulphurized, then adding mercury and concluding the amalgamation in the usual manner. Further experiments have shown me that equally good results can be obtained and time be saved if mercury be added to the pulp, together with the cement copper and other substances mentioned. In this way the silver mineral is amalgamated as fast as it is desulphurized. I have also found that while copper amalgam alone acts very slowly in desulphurizing silver minerals, yet in conjunction with an acid or an appropriate salt of the nature hereinafter described, it has an energetic action. Therefore, for the purpose of desulphurizing silver minerals in the amalgamation process I now use not only cement copper, but also copper amalgam or any substance which in contact with finely divided iron in the pulp derived from grinding the ore, or with the iron of the amalgamating pan, will form metallic copper, or copper amalgam if mercury be present at the same time, and in all cases I use at the same time an acid or a salt of the nature hereinafter described. I do not claim, in this connection, the use in the pans of sulphate of copper. I have found in practice that the formation of copper amalgam through its agency is slow, and attended by a large consumption of the iron of the pan. Cupric carbonate and cupric or cuprous oxide, especially when freshly precipitated from the solution of a copper salt, form readily copper amalgam when ground together with ore and mercury in an iron pan. I have also found that while cuprous chloride by itself acts imperfectly in desulphurizing silver minerals, yet in conjunction with an acid or appropriate salt it acts energetically even when no iron be present to reduce it to metallic copper. Common salt has also the property of stimulating the chemical reaction between copper compounds and silver sulphides but only in strong solution and I do not claim its use in conjunction with sulphate of copper or of cuprous chloride unless they be used in connection with the mechanical features of the herein described process, their use in ordinary pan amalgamation not being novel. I prefer in all cases the use of cement copper or a solid compound of copper, such as cupric oxide or carbonate, as chloride of copper increases the loss of mercury through the formation of calomel, and attacks the iron of which the pan is composed, and is also more expensive than cement copper.

In the ordinary pan amalgamation process, the pulp coming from the battery flows into settling tanks where the coarser portion is saved, while the finer portion, or slimes, amounting frequently to ten or twelve per cent. of the weight of the ore runs off with the excess of water and is only regained partially, and at considerable expense. The separation of the ore into sands and slimes is avoided in the so-called continuous system of amalgamation, where the pulp is conveyed directly from the battery, together with the water used in crushing the ore, into and through a series of pans on the same level, and overflowing each into the next one through connecting pipes. Owing to the large volume of water which must make its way along with the ore, the pulp occupies only a short time in passing through the whole series of pans, and with the method of treatment hitherto employed this time is not sufficient for the thorough amalgamation of any but the most docile silver minerals. When sulphate of copper and common salt are added to the ore, as is sometimes done to promote the amalgamation of the silver mineral, the chemical solution formed is so dilute that its efficacy is greatly enfeebled and to use less water in the battery would diminish the amount of ore crushed by a given number of stamps, and would only afford a partial remedy. The continuous system of amalgamation has hitherto failed in the treatment of coarse and rebellious sulphides of silver, but with the modifications I have invented its disadvantages have been overcome.

I have also invented another method of conducting the ore from the battery into the amalgamating pans, together with the water used in crushing, whereby the loss of slimes is avoided. In this method each pan receives and treats until the amalgamation is completed, a separate charge of pulp. I find that the amalgamation is more complete under these conditions, as in the continuous process a portion of the pulp may pass through the whole series of pans in less than the average time, and hence be imperfectly desilverized; neither does the amount of mercury in the pans remain constant as it is carried through the series of pans to a great extent along with the pulp, but if the chemical agents employed be sufficiently potent, and the amalgamating pans be present in sufficient number for a given character of ore, then the continuous process in connection with the modifications I have invented can also be advantageously employed.

In its chemical features my process consists in adding to the ore cement copper, or cuprous chloride, or copper amalgam, or a compound of copper which will yield copper amalgam when ground or agitated together with mercury and metallic iron—and also adding to the ore an acid or an appropriate salt which will stimulate the chemical reaction between the silver sulphides and the copper compounds in such a manner as to effect the speedy desulphurizing and amalgamation by mercury of the silver contents of the ore. These acids or salts, when in weak solution, furthermore act by slowly attacking the copper dissolved in the mercury, thereby creating a galvanic action which increases the amalgamating energy of the mercury, and stimulates the affinity of the copper in the mercury for the sulphur combined with silver minerals. For this purpose I have used so far the following acids and salts:—sulphuric acid, hydrochloric acid, or a mixture of sulphuric acid and common salt, nitric acid, ferrous sulphate, a mixture of ferrous sulphate and common salt, a mixture of ferrous sulphate and nitrate of soda, the solution formed by dissolving metallic iron in dilute nitric acid, the solution formed in precipitating with metallic iron the copper from a solution of sulphate of copper and nitrate of soda, manganous chloride, manganous sulphate, sodium sulphite, bisulphate of potash, salammoniac, alum, sulphate of alumina, a mixture of ferrous sulphate and nitrate of soda. I have found that the same chemical solutions which are known to be good conductors of the electric current are also efficient agents in effecting the desulphurizing and amalgamation of silver minerals when used in conjunction with cement copper or the copper compounds already mentioned in the presence of mercury.

In using the copper compounds mentioned I employ them in quantities proportionate to the amount of metallic copper they contain and which has been found by experiment to be required for the desulphurizing of the silver mineral in a given quantity of ore. Some of the salts mentioned act more energetically than others, and I use them in proportion to their potency and to the amount of water in which the ore is suspended, and I also use different combinations according to the nature of the ore. Thus fine sulphides of iron will decompose alum and sulphate of alumina and acids are neutralized by carbonate of lime. Manganous salts are not decomposed by carbonate of lime at the temperature required in amalgamation—a solution of ferrous chloride formed by dissolving metallic iron in a mixture of dilute sulphuric acid and salt has a very potent action in stimulating the chemical reactions between silver sulphides and metallic copper or the copper compounds mentioned. When treating ore with a silicious gangue I have found that the solution formed by dissolving metallic iron in four pounds of sulphuric acid diluted with water to which has been added enough common salt to combine with the sulphuric acid when added to one ton of ore suspended in twice its weight of water, and together with cement copper equal to one and one-half pound per ton of ore, will so greatly stimulate the decomposition and amalgamation of the silver mineral that the whole operation may be completed in from one and one-half to two hours' time, when the ore is agitated together with mercury and the aforesaid chemicals in properly constructed pans. It is essential to this rapid operation that the ore be suspended in a large excess of water thereby permitting the scattering of fine particles of mercury throughout the pulp by the revolution of the pan muller, and the free contact between the cement copper and silver mineral in the presence of the appropriate saline solution.

In practice I operate as follows:—The pulp flowing from the battery A is conveyed first into a large tub B which I call the accumulator, and which is provided with a stirring apparatus $b$ to prevent the pulp from settling. For this purpose there may be used a tub similar to the one I have described in United States Patent No. 473,395, dated April 19, 1892. If the top of the tub be higher than the discharge opening of the battery, the pulp is carried up by an elevator C to the required level. The pulp from the battery is collected and retained in the accumulator until the time for filling the pans arrives. The pulp is then drawn off from the accumulator by opening a valve $b'$ near its bottom, into amalgamating pans D, placed at a lower level. By this arrangement there is always on hand, when the pans are discharged, a supply of pulp in the accumulator for refilling them, at once. If the ore is to be allowed to remain, say, two hours, in the amalgamating pan, which is generally sufficient when the ore is treated in the manner herein described, then there had best be given to the accumulator the capacity of at least two pans and one accumulator can supply four pans, filling two pans at one time, and another couple one hour later. The maximum length of time during which the ore can remain in the pans is determined by the amount of ore and water coming from the battery, and the number of the pans employed and their capacity. The amount of chemicals, previously determined by experiment to be required for the treatment of the ore, can be charged into the accumulator, or put into the pan in proportion to the amount of ore and water in the accumulator or in the pan. The crushing capacity of the battery being known, and the amount of water used in crushing being also constant, the capacity of the accumulator or of the pan will indicate, with sufficient accuracy, the weight of chemicals to be put into each charge. Mercury may be added as soon as the pan is charged, and when the amalgamation is finished, the contents of the pan are drawn off into settlers in the usual manner. If the pulp were conveyed directly from the battery into the pans, without being first accumulated in tubs, much time would be lost in awaiting the gradual refilling of the pans after they are discharged. The accumulators facilitate operations and their use is not essential to the chemical treatment when each pan receives and treats, until the amalgamation is finished, a separate charge of pulp and chemicals. In the so-called continuous amalgamation process, where the ore flows uninterruptedly from the battery through a series of connecting pans, the chemicals, when any are used, are added at intervals, either in the first pan in the row, or, as has been suggested, into a larger pan or settler which overflows continuously through a connecting pipe into the first amalgamating pan. In this manner, however, the ore cannot receive the amount of chemicals required for thorough and economical treatment, as the quantity of chemicals charged at one time may be more than sufficient for the treatment of the quantity of pulp through which they are first diffused, while the stream of pulp flowing uninterruptedly onward, during the interval between charging the chemicals, receives none of the latter; or if the chemicals be charged at such short intervals that none of the ore entirely escapes their influence, it is nevertheless not possible to proportion, with any accuracy, their quantity to the amount of ore and water in the flowing stream into which they are thrown. I obviate this difficulty and make the chemical part of my process applicable also to the so-called continuous system of amalgamation by passing the pulp, first, through an accumulator with periodical discharge, interposed between the battery and the first amalgamating pan, in distinction from the continuous overflow of any mixing apparatus, such as has been suggested, in connection with the old system. For this purpose I use three tubs, as shown, provided with stirring apparatus. The pulp from the battery is accumulated in the first tub to the desired extent and is then diverted into the second tub. There is then put into the first tub the quantity of chemicals proportionate to the amount of ore and water present. The contents of the tub are then drawn off gradually by means of a steam siphon or pump E into a trough F leading to the first amalgamating pan of the series, at the same rate at which the tub was filled by the stream from the battery. While the first tub is being emptied, the second tub is filling, and when full, the stream from the battery is turned into the third tub, in case the first has not yet been entirely emptied. While the third tub is filling, the second is being emptied, and when the third tub is full, the filling of the first tub begins again. Each tub charge, before being drawn off, receives its due proportion of chemicals, and the pulp discharged from the accumulators, now flows uninterruptedly through the series of amalgamating pans, and thence, through connecting settlers, not shown, in the manner usually practiced in the old system.

While my Letters Patent No. 481,031, above referred to, cover some of the same ground as this specification, I show now how certain compounds of copper may take the place of cement copper, to which the aforesaid patent more especially refers, and I also show particularly the method of using cement copper or copper compounds in combination with an acid of salt, when the ore is carried into pans together with the water used in crushing.

I do not claim the combination with an amalgamating pan of another pan provided with a stirrer raised by steam, air or water pressure, and with drain cocks for separating slimes from heavier ore. Neither do I claim, as accumulators, hoppers or tanks not provided with the stirring apparatus. I do not claim the use, in amalgamation, of chloride of barium, in conjunction with mercury prepared with zinc or copper, nor the process of treating copperous silver ore by amalgamation with a solution of sea salt, nor the addition to the pulp, in amalgamation, of glucose and an alkali with soluble metallic salts.

The mechanical elements herein described, to wit, the accumulators, provided with a stirring apparatus and a mechanism for their periodical discharge, and connected on one hand with a battery for crushing ore, and on the other with amalgamating pans, constitute in their combination and use, as specified, a novel system or process of treating ore by amalgamation which can be advantageously used irrespectively of the kind of chemical treatment employed.

I am aware that it is not new to first crush ore and deposit it in receptacles of various nature, and then by a second operation to charge it into mixers connected with amalgamators, or to feed ore into a mixer from which it runs continuously into and through one or more amalgamators. Distinguishable from these operations is the herein described method of working which consists in conveying the pulp continuously and without intermediate deposition from the battery into tubs which I call accumulators and which are provided with a stirring apparatus, retaining the pulp therein until the desired moment for charging the amalgamating pans, and then discharging the pulp into the pans while it is being stirred.

Having thus described my invention, what I claim as new, and desire to secure by Letters Patent, is—

1. The improvement in the art of amalgamating silver ore which consists in adding to the ore, copper amalgam or its described equivalent, and also adding an acid or salt, having the property of stimulating the amalgamating energy of the mercury added to the ore, and the affinity of copper or the copper compounds specified, for sulphur combined with the silver minerals present, and agitating the pulp together with mercury and the aforesaid substances in iron pans, until the silver mineral is amalgamated, substantially as herein described.

2. The herein described process of amalgamation which consists in conveying the pulp in a continuous stream from a battery where it is crushed, together with the water used in crushing, into one or more accumulators, retaining and stirring the pulp therein, and discharging the contents of the accumulators periodically, while the pulp is being stirred, into amalgamating pans where the amalgamation is concluded in ways already known, substantially in the manner and for the purpose specified.

In witness whereof I have hereunto set my hand.

ALEXIS JANIN.

Witnesses:
S. H. NOURSE,
GEO. H. STRONG.